United States Patent [19]

Hutchisson et al.

[11] Patent Number: 5,264,997
[45] Date of Patent: Nov. 23, 1993

[54] SEALED, INDUCTIVELY POWERED LAMP ASSEMBLY

[75] Inventors: James T. Hutchisson, Bellevue; Craig A. Anderson, Seattle, both of Wash.

[73] Assignee: Dominion Automotive Industries Corp., Kent, Wash.

[21] Appl. No.: 846,200

[22] Filed: Mar. 4, 1992

[51] Int. Cl.⁵ ............................................ F21V 23/02
[52] U.S. Cl. ................................ 362/226; 362/265; 362/458; 313/493; 315/276; 315/283; 439/11
[58] Field of Search .......... 362/226, 221, 227, 249, 362/260, 263, 265, 267, 362, 368, 457, 458; 439/1, 11; 313/493, 634; 315/248, 276, 283

[56] References Cited

U.S. PATENT DOCUMENTS

| | | | |
|---|---|---|---|
| 1,533,613 | 4/1925 | Rubin | 439/11 |
| 2,462,336 | 2/1949 | Ruff | 315/283 |
| 3,909,670 | 9/1975 | Wakamatsu et al. | 315/276 |
| 3,980,921 | 9/1976 | Izawa | 315/283 |
| 4,176,310 | 11/1979 | Elenga et al. | 315/283 |
| 4,852,648 | 8/1989 | Akkerman et al. | 439/11 |
| 4,977,354 | 12/1990 | Bergervoet et al. | 315/248 |
| 5,034,658 | 7/1991 | Hiering et al. | 315/248 |

Primary Examiner—Richard R. Cole
Attorney, Agent, or Firm—Christensen, O'Connor, Johnson & Kindness

[57] ABSTRACT

A lamp assembly (10) for use with equipment such as construction vehicles and heavy trucks that are subjected to prolonged, intense vibrations. The lamp assembly of this invention includes a socket (14) formed by a shell (42). A sealed enclosure, in the form of a lamp housing (12), is releasably secured in the shell. The light source, such as a gas-discharge tube (16) or a set of LEDs (72) is located inside the lamp housing. A transformer primary winding (20), which is attached to a power source (56), is attached to the outside of the shell. A transformer secondary winding (22) connected across the light source is located inside the lamp housing. The secondary winding is located so that the lamp housing is seated in the socket, adjacent the primary winding. When a voltage is applied across the primary winding, an inductive voltage develops across the secondary winding. The voltage developed across the secondary winding is applied to the light source, which results in its energization and the emission of light thereby.

31 Claims, 4 Drawing Sheets

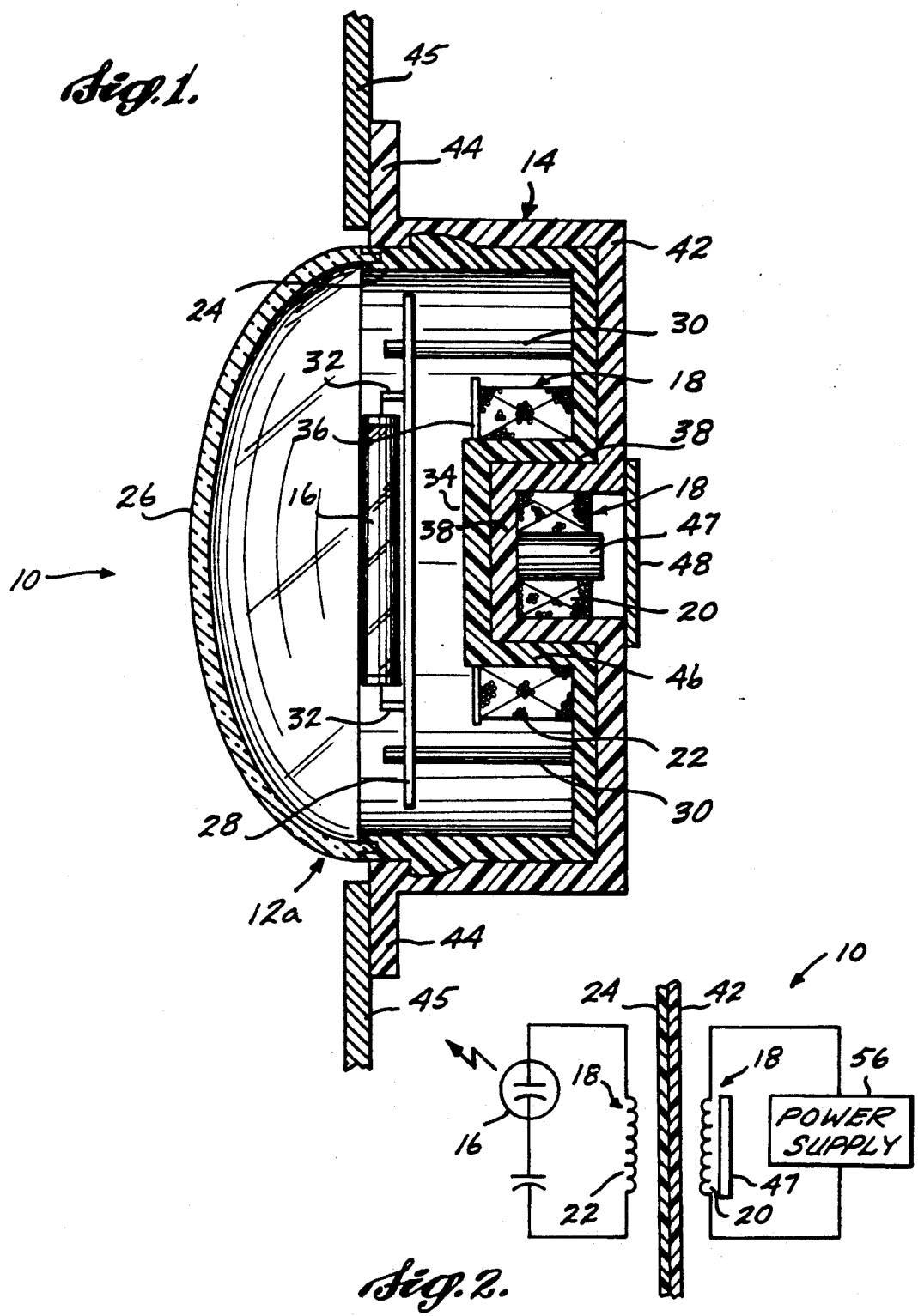

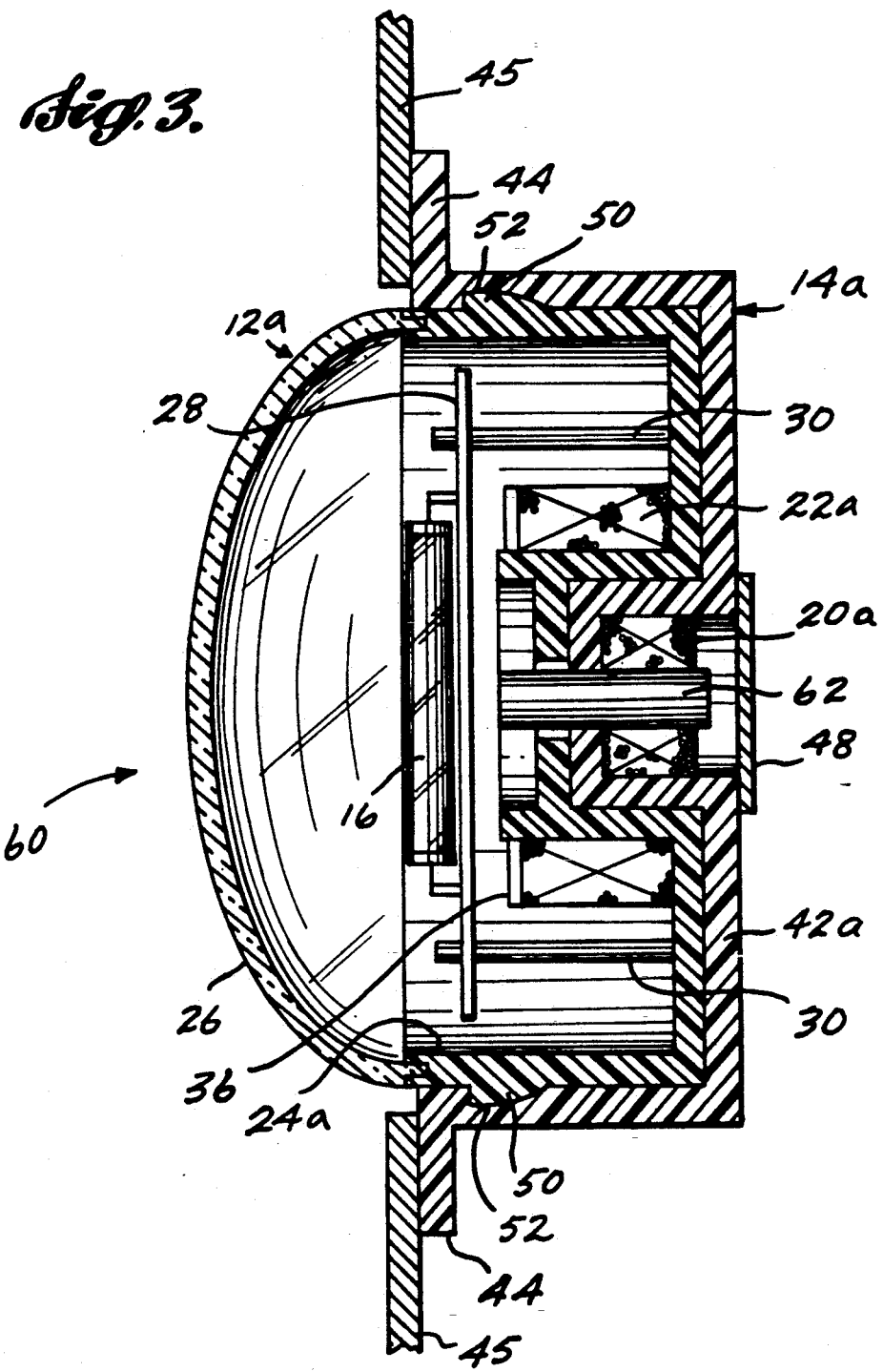

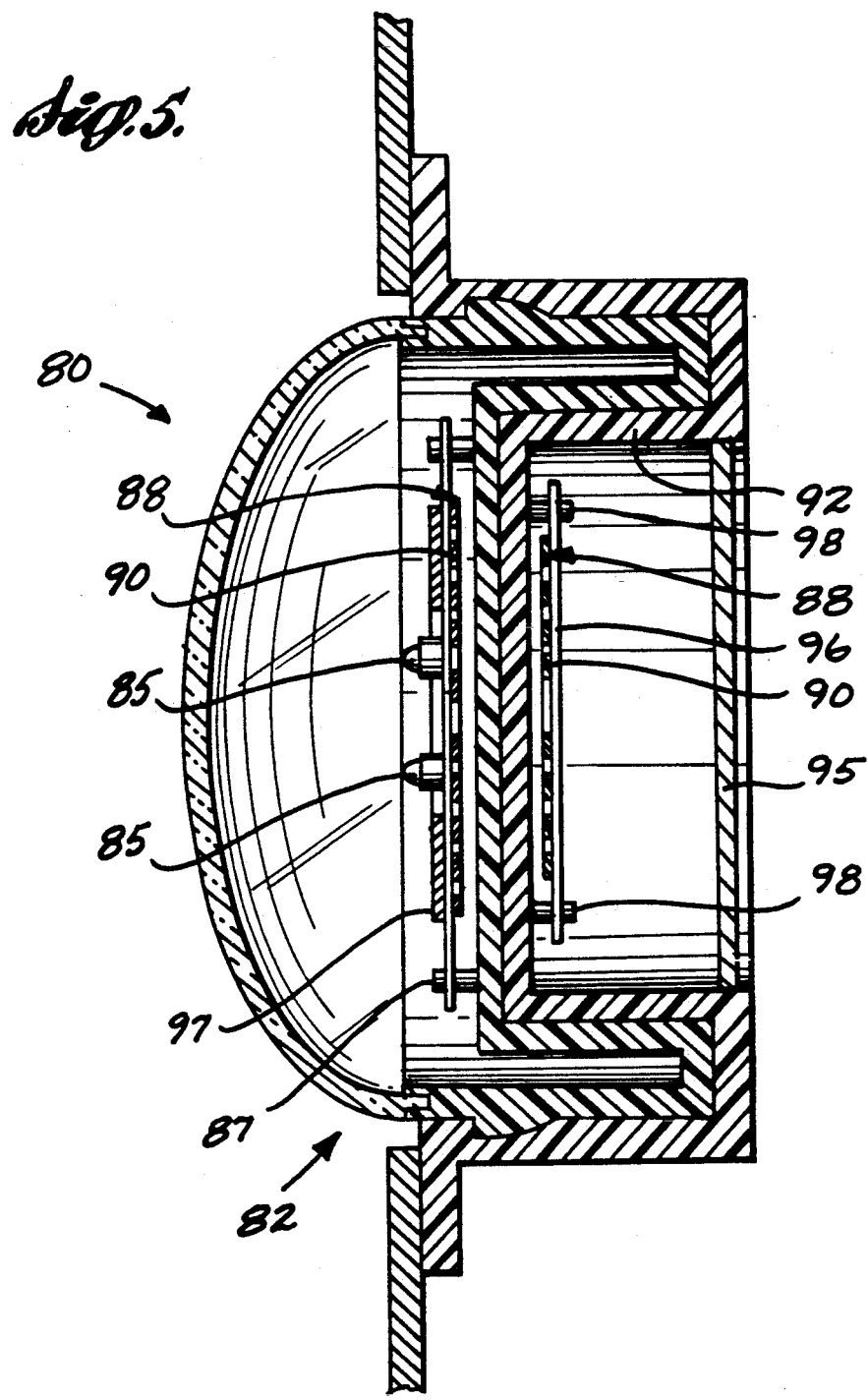

SEALED, INDUCTIVELY POWERED LAMP ASSEMBLY

FIELD OF THE INVENTION

This invention relates to lamp assemblies and, more particularly, to a lamp assembly able to withstand continuous vibrations and capable of emitting relatively large quantities of light while requiring small amounts of power.

BACKGROUND OF THE INVENTION

The external lights mounted to a vehicle are some of its most important safety equipment. Marker lights, which are turned on at night or in low-visibility situations, provide a distinct indication of the presence of the vehicle, and of the exact nature of the vehicle; car, small- or medium-sized truck, or large tractor-trailer combination. Stop, backup, and turn lights, which are selectively illuminated, are activated whenever the vehicle on which they are mounted undergoes, or is about to undergo, a corresponding change of motion. These lights, in combination with the marker lights, enable motorists, and others in the vicinity of a vehicle, to quickly comprehend the size, speed, and direction of a vehicle, as well as any changes in its speed and direction, so that appropriate action can be taken in order to avoid accidents.

While marker lights and other external lights have proved to be necessary safety tools, to date, it has been troublesome to mount such lights to the outside of some vehicles that constantly vibrate, such as heavy trucks and the like. This is because most of these light assemblies include a filament-type light bulb. The movement of the vehicle's vibration is often transferred directly to the light bulb, where it first fatigues and then breaks the thin, fragile filament. Moreover, many of these vehicles are operated in relatively cold environments. Prior to their energization, bulb filaments can be at or near the temperature of the surrounding environment. The energization of the filament quickly heats it and the adjacent posts to which it is attached. This rapid warming further fatigues both the filaments and the posts making them less able to withstand the stress imposed as a result of the vehicle's vibration. Consequently, the bulbs mounted in these assemblies have been known to burn out with high regularity.

One method used to reduce the rate at which these bulbs burn out has been to install them in environmentally hardened lamp assemblies. These assemblies typically include some type of shock-absorbing member for holding the bulb to minimize the shock to which it would otherwise be exposed. There is also usually a mechanical coupling for establishing a conductive link between the bulb and the vehicle's power supply system; this coupling is designed to maintain the connection in the event the bulb moves relative to the rest of the vehicle. These assemblies may also be constructed with relatively thick walls that serve to insulate the bulb elements therein to reduce the rate at which their temperature falls to that of the ambient environment.

While these lamp assemblies have served to increase the useful lifetime of the light bulbs with which they are used, they do have some drawbacks. These assemblies tend to have numerous components, which have made them expensive to install. Moreover, the components, in addition to being numerous, are often quite small. The disassembly and reassembly required to remove and replace a light bulb installed in one of these assemblies are frequently complicated, time-consuming tasks. Still another disadvantage of these assemblies is that in extremely cold environments their utility decreases. This is because in these environments the shock-absorbing members of these assemblies lose some of their flexibility. This reduces the assemblies' overall capabilities of minimizing shock. Moreover, in cold environments, regardless of the insulation offered by these assemblies, if a light is deenergized for a long enough period of time, the temperature of the filament and the adjacent components will fall to ambient levels. Upon energization, the filament and adjacent components will be rapidly heated and subjected to thermal shock not much different from that to which bulbs not similarly housed are exposed.

SUMMARY OF THE INVENTION

This invention relates generally to a lamp assembly able to withstand exposure to relatively harsh environmental conditions. More particularly, this is related to a lamp assembly that is inductively coupled to the power supply with which it is associated.

The lamp assembly of this invention includes a lamp housing in which a light source is housed and that is releasably secured in a socket. The socket is mounted to the vehicle or other body on which the lamp assembly is installed. The housing includes a backshell with a reflective coating and a transparent lens secured to the backshell through which the light emitted by the source is diffused into the surrounding environment. In some preferred embodiments of the invention, a filamentless gas-discharge tube is installed in the housing as the light source. The light source is energized by a transformer that includes a primary winding attached to the socket and a secondary winding disposed in the lamp housing. The primary winding is coupled to a power source capable of generating the power needed to energize the bulb. The secondary winding is connected across the bulb. The windings, though physically separated from each other by the body of the socket and the housing backshell, are positioned so that when the housing is disposed in the socket, they are adjacent each other.

When illumination of the light source is desired, the power supply is activated to cause an AC voltage to develop across the transformer primary winding. The subsequent magnetic field that develops around the primary winding induces a voltage in the secondary winding, which results in a current flow to the light bulb that, in turn, results in the emission of light.

The light source and associated secondary winding of the lamp assembly of this invention are both securely fitted in the lamp housing. Since the gas-discharge tube of some preferred embodiments of the invention is filamentless, it does not include any fragile internal components that are sensitive to motion. Moreover, the assembly of this invention does not include any conductive members between the sock and lamp housing. The lamp housing can move relative to the socket without risking failure of the conductive path over which the energization voltage is applied to the bulb. In other words, the lamp assembly of this invention does not have any fragile, unsecured components that are prone to fracture when exposed to prolonged vibrations and it maintains a continuous connection to the power supply with which it is associated, even when vibrated. Thus, the lamp assembly of this invention is well suited for installation on vehicles and other devices that are exposed to continuous mechanical vibrations. Also, the lamp assembly of this invention does not include any exposed electrical connections between the lamp housing and the socket; it is a sealed light source. This makes this lamp assembly well suited for placement in locations such as mine shafts or chemical storage tanks where the existence of explosive gases can make exposed electrical contacts, from which sparks can be generated, dangerous.

Furthermore, the gas-discharge tube employed is some preferred embodiments of this invention can be readily energized in low-temperature environments without placing undue wear on its internal components. The lamp housing forms an "oven" that maintains the gas-discharge tube at an optimal temperature to ensure that the maximum amount of light is emitted. Thus, not only is this lamp assembly well suited for operation in environments where there may be sustained mechanical vibration, it is further well suited for use in environments where the ambient temperature may be relatively low.

Still another advantage of the lamp assembly of this invention is that gas-discharge tubes have lower operating power requirements than incandescent bulbs that emit the same amount of light.

In alterative preferred embodiments of this invention, LEDs are employed as the light sources. In most of these embodiments of the invention, multiple LEDs are connected in series and/or in parallel in a single housing across a single transformer secondary winding to function as a single light-emitting source. An advantage of the use of LEDs as the light-emitting bulbs is that, for the same quantity of light emitted, they consume even less power than many gas-discharge tubes. Still another advantage of the use of LEDs in the lamp assembly of this invention is that they are substantially more rugged than bulbs or tubes that are formed of relatively fragile thin-walled glass structures.

BRIEF DESCRIPTION OF THE DRAWINGS

The invention is pointed out with particularly in the appended claims. The above and further advantages of this invention may be better understood by referring to the following description, when taken in conjunction with the accompanying drawings, in which:

FIG. 1 is a sectional view of a lamp assembly constructed in accordance with this invention;

FIG. 2 is a schematic diagram of the lamp assembly of this invention;

FIG. 3 is a sectional view of an alternative embodiment of the lamp assembly of this invention;

FIG. 5 is a sectional view of an alternative lamp assembly of this invention.

DETAILED DESCRIPTION OF THE PREFERRED EMBODIMENT

Figure 4:
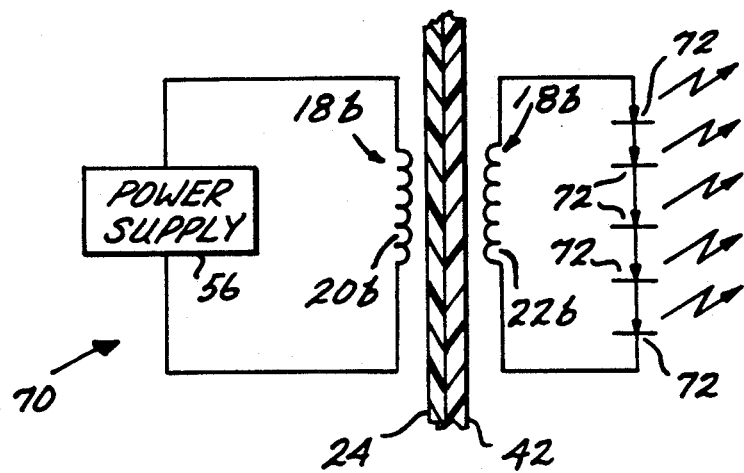
FIG. 4 is a schematic diagram of an alternative lamp assembly of this invention.

As depicted by FIG. 1, a lamp assembly 10 of this invention includes a lamp housing 12 that is releasably secured in a socket 14. A light source, such as a gas-discharge tube 16, is disposed inside the lamp housing 12. An energization voltage is applied to the gas-discharge tube 16 through a transformer 18. Transformer 18 has a primary winding 20 located inside the socket 14 and a secondary winding 22 located inside the lamp housing 12. Gas-discharge tube 16 is connected across the secondary winding 22. When the lamp assembly 10 is activated, an AC voltage is applied across the primary winding 20 to induce a like voltage across the secondary winding 22. The voltage induced across the secondary winding 22 is applied to the gas-discharge tube 16 to energize the tube, which results in the emission of light.

Lamp housing 12 is formed on an opaque backshell 24 and transparent lens 26 that form a sealed enclosure. The backshell 24 and lens 26 may have any suitable shape for the specific application for which the lamp assembly 10 of this invention is designed. For example, a backshell 24 and lens 26 combined to form a lamp housing 12 used as a vehicle marker, turn, clearance, or stop light may form a housing 12 that is between $\frac{1}{2}$ and $1\frac{1}{2}$ inches wide, $2\frac{1}{2}$ and 6 inches long, and $\frac{1}{2}$ and $1\frac{1}{2}$ inches deep. Backshell 24 is provided with a reflective coating (not illustrated), on its inner surface to maximize the amount of light emitted by assembly 10. The backshell 24 and lens 26 are formed of any suitable plastic material, such as a polycarbonate plastic. The backshell 24 should be formed of electrically insulating material that has a suitable flexibility to facilitate the installation and removal of the lamp housing 12 to and from the socket 14. Adhesives secure the backshell 24 and the lens 26 together so that they form an enclosure that is electrically sealed from the outside environment.

Gas-discharge tube 16 is mounted to a small printed wiring board 28 located inside the lamp housing 12. The printed wiring board 28 is snap fitted over posts 30 that are formed integrally with the backshell 24. In the illustrated embodiment of the lamp assembly 10, the printed wiring board 28 is formed with openings, not identified, that facilitate the mounting of the board to the posts 30. The gas-discharge tube 16 is soldered to the conductive stand-off posts 32 that are mounted on the printed wiring board 28. In some versions of the invention, the gas-discharge tube 16 may be further secured to the printed wiring board 28 by a collar formed of elastomeric material that is fitted around the tube and attached to the printed wiring board.

Secondary winding 22 is disposed around an inwardly directed cylindrical boss 34 formed integrally with the backshell 24. A plastic retaining ring 36 is secured over the end of the boss 34 inside the lamp housing 12 to prevent the secondary winding 22 from working loose. Posts 30 are dimensioned so that the printed wiring board 28 and gas-discharge tube 16 are spaced away from the secondary winding 22 and the boss 34. The outer surface of the portion of the backshell 24 that defines the boss 34 defines a cylindrical space 38 adjacent the outside of the lamp housing 12.

Socket 14 is formed of resilient plastic, such as a polycarbonate plastic. The main body of the socket 14 is a shell 42 that defines the space (not identified), in which the lamp housing 12 is seated. Integral with the shell 42 are a number of tabs 44 to facilitate the mounting of the lamp assembly 10 to the vehicle or other device with which the assembly will be used. Tabs 44 may be formed with openings to facilitate the mounting of the lamp assembly 10 to an adjacent frame element 45 with complementary fastening elements, (openings and fastening elements not illustrated).

The transformer primary winding 20 is disposed in a cylindrical protrusion 46 formed integrally with shell 42 that extends outwardly therefrom. Protrusion 46 has an outside diameter that allows it to be closely fitted into the space 38 defined by the backshell boss 34. The primary winding 20 is disposed in the cylindrical space (not identified), defined by protrusion 46. Primary winding 20 is dimensioned to abut the inner surface of the portion of the shell 42 that defines the protrusion 46. A ferrite rod 47 is positioned in the center of the primary winding 20 to enhance the strength of the magnetic field developed in the vicinity of the winding. A plastic disk 48 is fitted over the primary winding 20 and the rod 47 to prevent these components from vibrating out of the protrusion 46. Plastic disc 48 further serves to electrically seal primary winding 20 from the outside environment. In versions of this invention constructed to be installed on vehicles or to other structures with frame elements 45, such as iron, that have a relatively high degree of magnetic permeability, the socket should be formed so that the primary winding 20 is at least 250 mils (0.250 inches) away from the closest magnetic frame member. This prevents the magnetic field that develops around the primary winding 20 from inducing eddy currents in the frame member; these currents attenuate the magnetic field in the vicinity of the secondary winding 22 and, thus, reduce the magnitude of the potential that develops across the winding 22.

Various assemblies may be used to releasably secure the lamp housing 12 in socket 14. In the illustrated embodiment of the invention, the backshell 24 is formed with a number of outwardly extending tabs 50 that are seated in indentations 52 defined by the shell 42 to hold the lamp housing 12 in place. In this version of the invention, the lamp housing 12 is snap fitted into place. The lamp housing 12 can be removed from the socket 14 by simply prying with the blade of a screwdriver. Other versions of the invention may include a frame that extends around the outer perimeter of the lamp housing 12 that can be releasably attached to the adjacent support structure to secure the housing in place. In these embodiments of the invention, a gasket may be provided to serve as a shock-absorbing member between the frame and the lamp housing 12 and/or the lamp housing and the outer perimeter of the socket 14. The gasket may be a separate component or may be attached to the frame.

FIG. 2 schematically illustrates the lamp assembly 10 of this invention. The transformer primary winding 20 is connected across a power supply 56 capable of generating an AC voltage. In versions of the lamp assembly 10 constructed for installation in motor vehicles, the power supply 56 is typically some form of DC-to-AC voltage converter unit that transforms the DC voltage produced by the vehicle's alternator into an AC voltage. The power output characteristics of the power supply 56 are dictated by the voltage requirements of the light source installed in the particular lamp housing 12. In versions of this lamp assembly 10 that incorporate a gas-discharge tube 16, a potential between approximately 150 and 400 ACV at anywhere from 60 Hz to 40 kHz is applied across the tube in order to cause the emission of light thereby. When multiple lamp assemblies 10 are employed together, their primary windings will normally be connected in parallel across the power supply 56. The gas-discharge tube 16 is connected across the secondary winding 22. A capacitor 58 is connected between the gas-discharge tube 16 and the secondary winding to limit current flow through the tube.

When the lamp housing 12 is secured in the socket 14, primary winding 20 is at least partially, if not entirely, located within the secondary winding 22. In the described embodiment of the invention, the material forming both the backshell 24 and socket shell 42 is approximately 62 mils thick. Allowing for tolerances needed to ensure that the housing 12 has at least a limited degree of movement when disposed in the socket 14, the windings are separated by a distance of between approximately 125 and 250 mils. At this separation, the development of a fluctuating electromagnetic field about the primary winding 20 will induce a complementary potential across the secondary winding 22. In other embodiments of the invention, the primary and secondary windings 20 and 22, respectively, may be separated between 100 and 1000 mils from each other.

When the lamp assembly 10 of this invention is activated, the power supply 56 generates a current flow through the primary winding 20. Even though the transformer windings 20 and 22 are separated by the shell 42 and the backshell 24, because they are in close proximity, the electromagnetic field that develops around the primary winding 20 induces a complementary potential across the secondary winding 22. The subsequent current flow in the secondary winding energizes the gas-discharge tube 16 resulting in an emission of light thereby.

Gas-discharge tube 16 of the lamp assembly 10 of this invention is supplied with an energization voltage even though there is no direct conductive path from the power supply 56. If the lamp assembly 10 is subjected to intense or prolonged vibration, resulting in the movement of the lamp housing 12 relative to the socket 14, gas-discharge tube 16 will continue to receive an energization voltage. Thus, the lamp assembly 10 of this invention is well suited to provide a light source attached to structural elements or subjected to such vibrations, since it will continue to provide light and does not need to be provided with a shock-absorbing member in order to ensure the consistent application of an energization voltage to the gas-discharge tube.

Another feature of the lamp assembly 10 of this invention is that the gas-discharge tube 16 does not include a filament. Unlike bulbs with filaments, tube 16 can withstand vibrations without is internal components suffereing failure-inducing mechanical fatigue. Moreover, at low temperatures the energization of tube 16 similarly does not unduly fatigue it or the other components within the lamp housing 12. Also, once power is applied across the transformer 18, lamp housing 12 forms an "oven" that retains the waste heat given off by the secondary winding 22 and the tube 16. This heat warms the gas-discharge tube and the gas therein to ensure that the tube functions at its optimal operating temperature.

Versions of this invention that employ gas-discharge tubes 16 as their light sources are also more energy efficient than other lamp assemblies. A lamp assembly 10 of this invention with a gas-discharge tube 16 can emit 3,500 to 7,000 candelas/m$^2$ with the application of only 2 to 3 watts of power. These versions of the invention are well suited for use with equipment that may be able to provide power from a storage battery. For example, marker lights of this invention would keep a disabled truck visible for an extended period of time without draining the truck's battery.

An alternative lamp assembly 60 of this invention is described with respect to FIG. 3. Lamp assembly 60 includes a ferrite rod 62 that, while mounted to a shell 42a, extends out through the shell and into the lamp housing 12a. The lamp backshell 24a of lamp housing 12a is formed with an opening 64 that is wider than the circumference of the ferrite rod 62. This ensures that if the lamp housing 12a vibrates relative to the socket 14a, backshell 24a will not butt against the ferrite rod 62 and fracture.

Backshell 24a of lamp housing 12a is further formed so that there is a tubular ring 66 concentric with the boss 34a and of an equal diameter that extends such that the ring is located inside the housing and is at one with the boss. The secondary winding 22a of this embodiment of the invention is disposed over both the boss and the tubular ring. Ferrite rod 62 extends into the center of the space defined by the ring 66 such that it is located on the center axis of the transformer secondary winding 22a. An advantage of this embodiment of the invention is that ferrite rod 62 serves to further magnify the inductive coupling of current from the primary winding to the secondary winding.

FIG. 4 illustrates a lamp assembly 70 of this invention wherein the light source comprises a set of LEDs 72. In this embodiment of the invention a transformer 18b provides the inductive power link across the lamp housing 12b and socket 14b. Transformer 18b includes a primary winding 20b connected across the power supply 56 and a secondary winding 22b connected across the LEDs 72. In one version of this embodiment of the invention, both the primary winding 20b and the secondary winding 22b are formed of 24 turns of 24-gauge wire. The wire forming the windings 20b and 22b is shaped so that each winding is generally spiral shaped, has a thickness between 125 and 250 mils, an outside diameter of approximately 1¾ inches and an inside diameter of approximately 1⅛ inches. The windings 20b and 22b are separated by a distance of approximately 125 mils. At a separation of this distance, the application of a voltage to the primary winding 20b will induce a voltage in the secondary winding 22b sufficient to energize the LEDs 72 even though transformer 18b is not provided with a ferrite rod.

One specific type of LED that can be used as the LEDs 72 of this invention is the HLMP-8103 LED manufactured by the Hewlett Packard Company. This type of LED emits approximately 3 candelas of light, has a forward voltage drop of approximately 1.85 VDC, has a reverse-breakdown voltage of approximately 20 VDC, and draws approximately 20 to 40 milliamps of current. This LED emits light at a peak wavelength of 650 nm, the wavelength of red light. An alternative LED that can be employed in lamp assembly 70 of this invention is the HLMA-CL00, also manufactured by Hewlett Packard. This LED emits approximately 1.3 candelas of light, has a forward voltage drop of approximately 2.0 volts, a reverse-breakdown voltage of approximately 35 volts, and draws approximately 20 to 25 milliamps of current. This LED emits light at a peak wavelength of 590 nm, the wavelength of amber light.

When lamp assembly 70 is activated, an alternating voltage of approximately 10 to 15 volts at approximately 60 Hz to 40 kHz is applied across the primary winding 20b. When the LEDs 72 are forward biased, their semiconducting material is excited into emitting light. Since the rate at which the voltage across the LEDs 72 changes polarity is so rapid, the eye does not perceive the on-off-on-off flicker that occurs as a result of the forward-reverse-forward-reverse bias changes across the diodes.

An advantage of lamp assembly 70 of this invention is that the LEDs 72 consume a relatively small amount of power for the amount of light they emit. For example, the five-LED assembly depicted in FIG. 4 consumes approximately 0.350 watts of power. Also, LEDs have longer useful lives than other light sources. Still another advantage of this version of the invention is that LEDs are much more rugged than other light sources, especially those that have some type of large, thin-walled glass member or shell. Consequently, LEDs are better able to withstand being subjected to extreme and/or prolonged vibrations that are other types of light sources. Thus, since the LEDs are not prone to vibration-induced breakage, they can be mounted inside the lamp housing 12 without having to provide costly shock-absorbing members. Still another advantage of lamp assembly 70 of this invention is that the individual lamp housings 12 can be provided with LEDs 72 that emit light at different colors. For example, lamp housings intended for use as turn lights or backup lights can be provided with LEDs that emit red light, while lamp housings intended for use as marker lights can be provided with LEDs that emit amber light. This makes it possible to provide the lamp housings with lenses 26 that are clear, as opposed to shaded lenses that can attenuate the amount of light emitted by the individual assemblies.

In still other embodiments of the invention, the light sources and the transformer secondary winding may be on a single printed wiring board disposed in the lamp housing as depicted in FIG. 5. Lamp assembly 80 of this embodiment of the invention includes a lamp housing 82 disposed in a socket 84. The light source comprises a set of LEDs 85, two shown, that are mounted to the outwardly directed surface of a printed wiring board 86 disposed inside lamp housing 82. Except for dimension differences, lamp housing 82, socket 84, printed wiring board 86, and LEDs 85 are substantially identical to the components described with respect to the previously discussed embodiments of the invention. Printed wiring board 86 is mounted to a set of posts 87 so that the board is spaced slightly away from the rear of the lamp housing 82.

A transformer 88 supplies the energization voltage that biases the LEDs 85 to cause the emission of light thereby. Transformer 88 comprises a primary winding 90 disposed in a protrusion 92 that extends outward from the socket 84 and a secondary winding 94 inside the lamp housing 82. Primary winding 90 is formed on the outwardly directed face of a printed wiring board 96 secured in the protrusion 92 by a set of posts 98. A plastic disk 95 is fitted over the inner end of protrusion 92 to seal primary winding 90 in the protrusion. Secondary winding 94 is disposed on the inwardly directed face of printed wiring board 86 inside the lamp housing 82. Printed wiring boards 86 and 96 are positioned relative to each other, and the transformer windings 90 and 94 are formed on the boards so that windings are aligned with each other. In one version of this embodiment of the invention, windings 90 and 94 are each in the form of a single-layer conductive track that is selectively formed on the associated printed wiring board 96 or 86 to have a spiral shape. Each track is in the form of a 26-turn spiral wherein the outer diameter of the spiral is approximately 2.250 inches, the inner diameter is approximately 0.8750 inches in diameter, and is shaped so that the individual conductive turns each have a 32-mil width and are separated from the adjoining turns by approximately 32 mils. The individual windings are separated by a distance between 125 and 250 mils.

The transformer 88 is also provided with a ferrite core in the form of a ferrite ring 97 on printed wiring board 86 adjacent the secondary winding 94. The ferrite ring 97 is disposed on the outwardly directed side of the printed wiring board 86 so that the ring 97 and the winding are separated by the thickness of the printed wiring board. Ferrite ring 97 may be an actual metal ring that is secured to the printed wiring board 86 by epoxy or other suitable adhesive. Alternatively, ferrite ring 97 may be formed from a ferrite emulsion that is selectively applied to the board 86 and that is cured to form the hardened ring. Such emulsion may be formed by mixing ferrite particles in a bonding agent, such as an epoxy coating. Generally, ferrite ring 97 should be dimensioned and shaped so that it subtends approximately the same area subtended by the tracks that form the secondary winding 94. The ferrite ring 97 enhances the flux density of the electromagnetic field that forms in the vicinity of the secondary winding 94. This increases the potential that is developed across the secondary winding 94. Thus, the incorporation of the ferrite ring 97 in the lamp housing 82 serves to reduce the potential that needs to be applied across the primary winding 90 in order to induce the development of a potential across the secondary winding sufficient to cause the emission of light.

The LEDs 85 have leads that extend through the printed wiring board 86 and that are soldered to contact pads that are electrically connected to the secondary winding 94 (LED leads and contact pads not shown). Alternatively, printed wiring board 86 may be formed with vias that provide a conductive path to its outwardly directed face and the LEDs 85 may be connected to contact pads on that surface of the board. Printed wiring board 96 may also be provided with vias so that wires supplying the energization voltage to the primary winding 90 may be attached to the board on the side opposite the side on which the winding is formed. In FIG. 5, the LEDs 85 are shown as being inside the center of the ferrite ring 97. In alternative versions of the invention it may be desirable to locate one, more, or all of the LEDs so they are located outside of the ferrite ring.

Printed wiring board 86 serves as a substrate for both the LEDs 85 and the secondary winding 94. The mounting of the LEDs 85 and forming the transformer secondary winding 94 on the single board 86 serve to minimize the costs associated with assembling the lamp housing 82 of this embodiment of the invention. Moreover, since both the secondary winding 94 and ferrite ring 97 are integrally attached to the printed wiring board 86, neither the winding nor the ring can separate from the board causing failure of the lamp assembly 80. Also, both windings 90 and 94 are relatively thin; this feature makes it possible to provide lamp assemblies 80 of this invention with relatively thin overall profiles.

Figure 6:
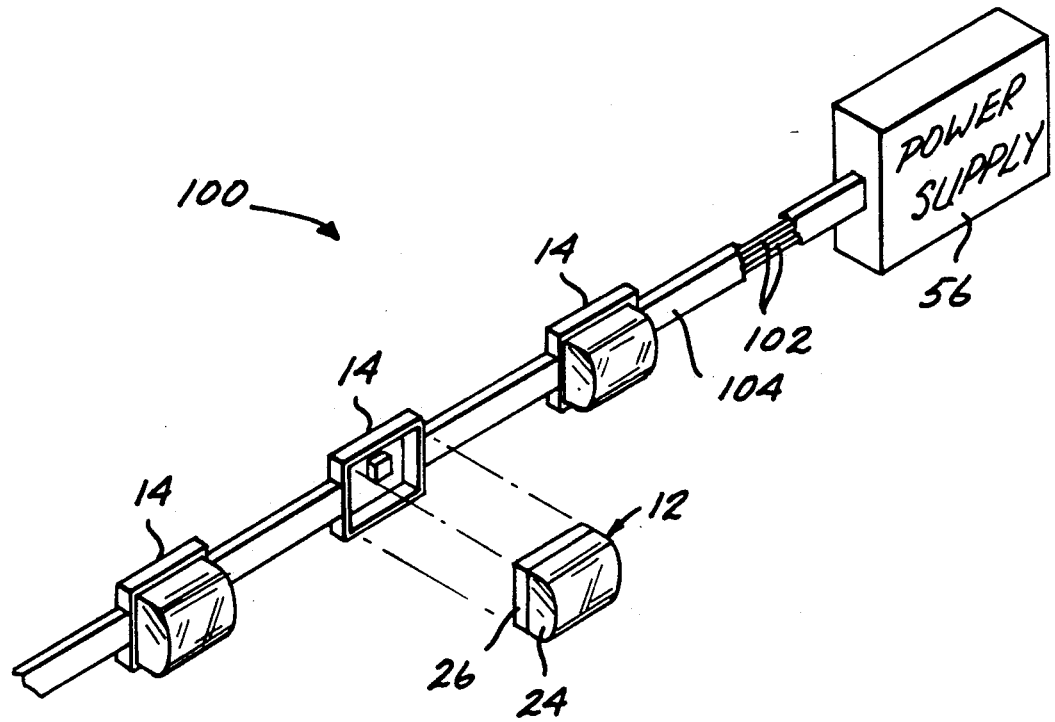
FIG. 6 is a block diagram illustrating how the lamp assembly of this invention can be employed to serve as a multilight fixed-light source.

Multiple lamp assemblies of this invention can be used to provide a sealed lighting system 80, as illustrated in block diagram by FIG. 6. Lighting system 100 includes a number of lamp housing 12/socket 14 pairs. The lamp energization voltage is supplied to the primary windings 20 (FIG. 1) inside the sockets 14 from the power supply 56 over a single pair of conductors 102. Conductors 102 are contained in a set of electrically insulated pipes 104, which extend from the power supply 56 to the socket 14 and between the sockets. Pipes 104 may be formed from any nonconductive material. For example, the pipes 104 may comprise multiple sections of PVC-type plastic tubing that are connected together.

The transformer primary and secondary windings, 20 and 22, respectively, (FIG. 1) inductively transfer the energization voltage from the conductors 102 across the socket and housing backshell 24 (FIG. 1) to the light sources inside the housings 12. The conductors 102 are contained within an insulated shell, the pipes 104. Lighting system 100 is thus a completely sealed system that does not have any exposed electrical contacts across which a spark can form. This feature makes lighting system 100 well suited to provide light in mine shafts, chemical storage tanks, and other locations where the existence of explosive vapors or particulate matter can make the installation of a lighting system around which sparks can form a dangerous proposition.

The foregoing description has been limited to specific embodiments of the invention. It will be apparent, however, that variations and modifications may be made to the invention with the attainment of some or all of the advantages thereof. For example, in the described embodiments of the invention, filamentless gas-discharge tubes 16 and LEDs 72 are employed as the light-emitting members. In other embodiments of the invention, it may be desirable to use other types of light sources, including light bulbs with filaments. Furthermore, it should be understood that embodiments of this invention, other than those in which LEDs are incorporated, may be provided with multiple light sources in a single lamp housing. In a similar vein, it is possible to provide other versions of this invention where there may be a lamp housing with multiple secondary windings, each of which is inductively coupled to a separate primary winding or to a single, common, primary winding. In these versions of the invention, each secondary winding may be coupled across a separate light source, or each may be used to supply power to a common light source. Furthermore, in some versions of the lamp assembly 70 of FIG. 4 it may be desirable to provide a row/column array of LEDs wherein multiple sets of series-connected LEDs are connected in parallel across the secondary winding 22b. Also, in some embodiments of the invention it may be desirable to connect a rectification diode across the secondary winding 22b to cause a DC voltage to be applied across the LEDs 72 or other light source. It may also be desirable to connect a resistor in series with the LEDs 72 or other light source to limit the voltage applied across it.

It should equally be understood that the disclosed structures of lamp housing 12 and socket 14 are similarly meant to be illustrative and not limiting. In some versions of the invention, it may be desirable to shape these members and position their associated components so that the transformer secondary winding will be disposed inside the primary winding. Also, there may be versions of the invention where it will be desirable to form the secondary winding on a printed wiring board that is separate from the board on which the light source is mounted. Similarly, there is no requirement that both the windings be formed of wire or be formed on a printed wiring board; in some versions of the invention, it may be desirable to have one winding formed on a printed wiring board while the other winding is formed from a wire wrap. Therefore, it is the object of the appended claims to cover all such variations as come with the true spirit and scope of the invention.

The embodiments of the invention in which an exclusive property or privilege is claimed are defined as follows:

1. A lighting system comprising:
    at least two lamp assemblies, each said lamp assembly comprising:
        a shell formed from electrically nonconductive material wherein said shell is shaped to form a socket and wherein said shell is provided with a sealed enclosure adjacent said socket and a primary winding disposed in said enclosure;
        a lamp housing forming a sealed enclosure wherein said lamp housing is formed from electrically nonconductive material and dimensioned to fit in said socket, including a light source disposed in said enclosure and a secondary winding disposed in said enclosure and connected across said light source, wherein said secondary winding is positioned in said enclosure so that, when said lamp housing is disposed in said socket, said secondary winding is adjacent said primary winding; and
        means for releasably securing said lamp housing in said socket;
    a set of conductors extending between said shell enclosures for electrically connecting said primary windings; and
    an electrically nonconductive enclosure disposed around said set of conductors wherein said enclosure extends between said shell enclosures to seal said set of conductors therein.

2. The lighting system of claim 1, further including a set of energization conductors extending from at least one of said primary windings for supplying an energization voltage to said lamp assemblies from a power source and an electrically nonconductive enclosure disposed around said energization conductors, said enclosure coupled to said shell with which said at least one of said primary windings is associated to electrically seal said energization conductors adjacent said shell.

3. The lighting system of claim 1, wherein said electrically nonconductive enclosure is formed of at least one section of plastic tubing.

4. The lighting assembly of claim 1, wherein said lamp housing of said at least one lamp assembly includes a printed wiring board and said secondary winding is disposed on said printed wiring board.

5. The lighting system of claim 1, wherein said shell of said at least one lamp assembly is provided with a printed wiring board and wherein said primary winding is formed on said printed wiring board.

6. The lamp assembly of claim 5, wherein said light source contained in said lamp housing of said at least one lamp assembly is mounted on said printed wiring board.

7. The lighting assembly of claim 1, wherein said lamp housing of said at least one lamp assembly includes a printed wiring board and said secondary winding is disposed on said printed wiring board.

8. A lamp assembly comprising:
    a shell that defines a socket;
    a lamp housing assembly including a lamp housing dimensioned to fit in said socket and shaped to form an enclosure, and define an opening adjacent said shell and a light source disposed in said lamp housing; and
    a transformer comprising: a primary winding disposed in said socket and adapted for attachment to a power supply; a secondary winding disposed in said lamp housing and connected across said light source; and a ferrite core adjacent said primary winding, said ferrite core extending out of said socket through said opening and into said lamp housing enclosure, wherein said secondary winding is positioned in said lamp housing adjacent said lamp housing opening to at least partially surround a portion of said ferrite core that extends into said lamp housing enclosure.

9. The lamp assembly of claim 8, wherein said primary winding is in the form of a wire winding.

10. The lamp assembly of claim 8, wherein said secondary winding is in the form of a wire winding.

11. A lamp assembly comprising:
    a shell that defines a socket, said shell being formed with an outwardly directed protrusion, and including a primary winding attached to said shell and disposed in said protrusion; and
    a lamp assembly including: a lamp housing forming an enclosure dimensioned to fit into said socket, said lamp housing further being formed with an inwardly directed boss that defines a space for receiving said shell protrusion; a light source disposed in said enclosure; and a secondary winding disposed in said enclosure and connected across said light source, said secondary winding being disposed around said boss so as to be located adjacent said primary winding.

12. The lamp assembly of claim 11, wherein said light source is a gas-discharge tube.

13. The lamp assembly of claim 11, wherein said light source includes at least one LED.

14. The lamp assembly of claim 11, further including a printed wiring board secured inside said lamp housing wherein said secondary winding is formed on said printed wiring board.

15. The lamp assembly of claim 14, wherein said light source is mounted to said printed wiring board.

16. The lamp assembly of claim 14, further including a printed wiring board secured to said socket adjacent said lamp housing, wherein said primary winding is formed on said printed wiring board.

17. The lamp assembly of claim 11, wherein said shell and said lamp housing are provided with complementary fastening members for releasably securing said lamp housing in said socket.

18. The lamp assembly of claim 17, further including a printed wiring board secured to said socket adjacent said lamp housing, wherein said primary winding is formed on said printed wiring board.

19. A lamp assembly comprising:
    a socket formed from a shell including a primary winding attached to said shell and adapted for connection to a power source; and
    a lamp assembly including: a lamp housing forming an enclosure dimensioned to fit in said socket; a light source disposed in said enclosure; a printed wiring board secured in said lamp housing; and a secondary winding formed on said printed wiring board in said lamp enclosure, said secondary winding being positioned adjacent said primary winding.

20. The lamp assembly of claim 19, wherein said light source is a gas discharge tube.

21. The lamp assembly of claim 19, wherein said light source includes at least one LED.

22. A lamp assembly comprising:
 a socket assembly including: a shell; a printed wiring board secured to said shell; and a primary winding adapted for attachment to a power supply wherein said primary winding is formed on said printed wiring board; and
 a lamp assembly including: a lamp housing forming an enclosure and dimensioned to fit in said socket assembly; a light source disposed in said lamp housing enclosure; and a secondary winding disposed in said enclosure and connected across said light source, said secondary winding being positioned in said lamp housing so that, when said lamp assembly is disposed in said socket assembly, said secondary winding is adjacent said primary winding.

23. The lamp assembly of claim 22, wherein said light source is a gas-discharge tube.

24. The lamp assembly of claim 22, wherein said light source comprises at least one LED.

25. The lamp assembly of claim 22, wherein said light source is mounted to said printed wiring board.

26. A socket for receiving a lamp assembly having a secondary winding contained therein, said socket including:
 a shell defining an exterior space to receive the lamp assembly;
 a printed wiring board secured to said shell, said printed wiring board being spaced away from said exterior space defined by said shell; and
 a primary winding formed on said printed wiring board wherein said primary winding is adapted for connection to a power supply and is located in said shell so that, when the lamp assembly is disposed in said exterior space, said primary winding is adjacent the secondary winding in the lamp housing.

27. The socket of claim 26, wherein said shell is formed with an outwardly directed protrusion defining said exterior space and said primary winding is disposed in said protrusion.

28. A lamp assembly for installation in a socket having a primary winding, said lamp housing including:
 a back shell and lens secured together to form an enclosure, said enclosure dimensioned to fit into the socket;
 a light source disposed in said enclosure;
 a printed wiring board disposed in said enclosure; and
 a secondary winding formed on said printed wiring board and connected across said light source, wherein said secondary winding is positioned in said enclosure so that, when said lamp housing is disposed in said socket, said secondary winding is adjacent the primary winding.

29. The lamp assembly of claim 28, wherein said enclosure is formed with an inwardly directed boss that defines a space adjacent said socket and said secondary winding is mounted on said boss.

30. The lamp assembly of claim 28, further including a ferrite member mounted to said printed wiring board.

31. The lamp assembly of claim 28, wherein said light source is mounted to said printed wiring board.

* * * * *

UNITED STATES PATENT AND TRADEMARK OFFICE
CERTIFICATE OF CORRECTION

PATENT NO. : 5,264,997
DATED : November 23, 1993
INVENTOR(S) : J.T. Hutchisson, et. al.

It is certified that error appears in the above-indentified patent and that said Letters Patent is hereby corrected as shown below:

Column 2, line 59, "sock" should read --socket--.
Column line 11, "is" should read --in--.
Column 3, line 42, "particularly" should read --particularity--.
Column 6, line 46, "suffereing" should read --suffering--.

Signed and Sealed this

Seventh Day of June, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,264,997
DATED : November 23, 1993
INVENTOR(S) : J.T. Hutchisson et al.

It is certified that error appears in the above-indentified patent and that said Letters Patent is hereby corrected as shown below:

On the title page, item [73], "Dominion Automotive Industries Corp., Kent, Wash" should read --
Dominion Automotive Group, Inc., Ontario, Canada--

Signed and Sealed this

Twelfth Day of July, 1994

*Attest:*

BRUCE LEHMAN

*Attesting Officer*    *Commissioner of Patents and Trademarks*